United States Patent [19]
Sasaki

[11] Patent Number: 5,674,012
[45] Date of Patent: Oct. 7, 1997

[54] PRINTING SYSTEM AND METHOD OF PRINTING GRAPHIC DATA

[75] Inventor: Ichiro Sasaki, Chita-gun, Japan

[73] Assignee: Brother Kogyo Kabushiki Kaisha, Aichi-ken, Japan

[21] Appl. No.: 411,989

[22] Filed: Mar. 28, 1995

[30] Foreign Application Priority Data

Mar. 28, 1994 [JP] Japan .................................. 6-082337

[51] Int. Cl.⁶ ................................................ H04N 01/00
[52] U.S. Cl. ............................ 400/61; 382/239; 395/114
[58] Field of Search ...................... 400/61, 76; 382/239; 393/114

[56] References Cited

U.S. PATENT DOCUMENTS

| | | | |
|---|---|---|---|
| 4,633,326 | 12/1986 | Endoh et al. | 382/239 |
| 5,166,987 | 11/1992 | Kageyama | 382/239 |
| 5,228,118 | 7/1993 | Sasaki | 395/114 |

FOREIGN PATENT DOCUMENTS

| | | | |
|---|---|---|---|
| 0545648 | 6/1993 | European Pat. Off. | 400/61 |
| 0550247 | 7/1993 | European Pat. Off. | 400/61 |

Primary Examiner—Edgar S. Burr
Assistant Examiner—Steven S. Kelley
Attorney, Agent, or Firm—Kane, Dalsimer, Sullivan, Kurucz, Levy, Eisele and Richard, LLP

[57] ABSTRACT

To increase the efficiency of graphic data print process in a printer, graphic print data such as diagrams and images are compressed in a personal computer according to a special compression/coding format specific of the printer to be used so that the resultant compressed graphic print data can be developed into dot image data in the printer. The resultant compressed graphic print data is transmitted to the printer and is temporarily stored in reception data buffer of the printer. The compressed graphic print data stored in the reception data buffer is developed into dot image print data. Printing is performed on a print sheet by a printing mechanism according to the developed dot image print data.

18 Claims, 8 Drawing Sheets

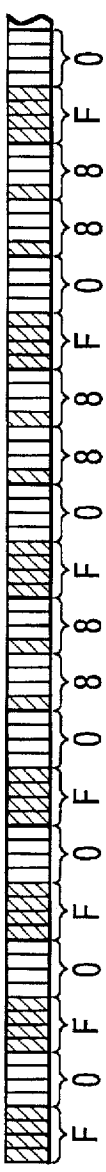
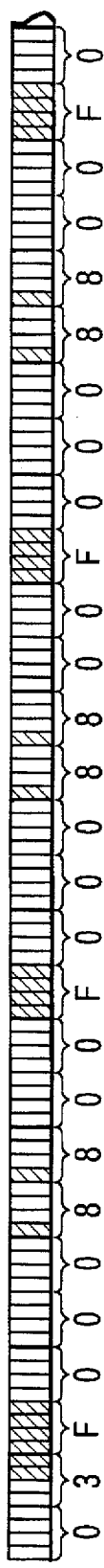
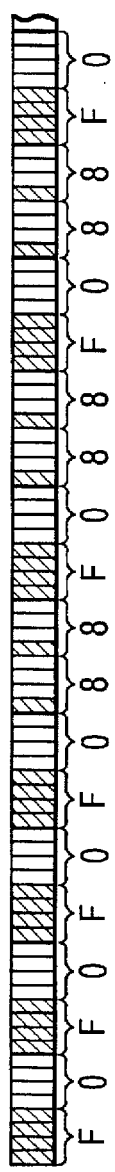
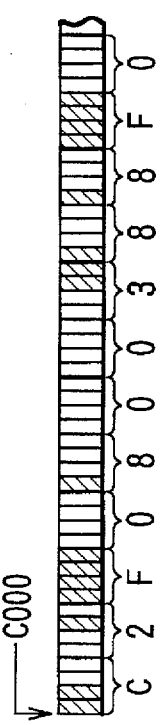
FIG. 7 (a)
FIG. 7 (b)
FIG. 7 (c)
FIG. 7 (d)

PRINTING SYSTEM AND METHOD OF PRINTING GRAPHIC DATA

BACKGROUND OF THE INVENTION

1. Field of the Invention

The present invention relates to a printing system and a method of printing wherein compressed print data is transmitted from a print data preparation device to a printer, the compressed print data is developed into dot image data and printed in the printer, and more particularly to compressing and encoding graphic print data using a compression encoding format which produces print data with print positions that allow its development into dot images and to transmit the print data to the printer.

2. Description of the Related Art

Conventionally, there has been known a printing system wherein print data is prepared in a print data preparation device, such as a host computer or a personal computer, and then printed with, for example, a laser printer capable of printing the prepared print data at high speeds.

When transmitting print data formed from graphic data (image data) prepared using the print data preparation device, a transmission driver (such as a transmission data compression control program) for compressing, encoding, outputting, and transmitting the graphic print data is provided in connection with the print data preparation device because the graphic data is composed from several bits of data. The graphic print data is compressed, encoded, outputted, and transmitted by the transmission driver. Examples of transmission drivers include run-length formats wherein data is compressed according to detection of repetitions in bit data and delta low formats wherein data is compressed by comparing raster bit data form one raster scan with raster data from the previous raster scan.

Compressed graphic print data transmitted from the print data preparation device is temporarily received in a reception data buffer of the laser printer. The compressed print data in the reception data buffer is decoded into the original graphic print data. Then the graphic print data is again compressed into compressed print data with a format that allows its development into dot image data, which the printing mechanism can use for printing. The compressed print data is transmitted to and stored in an intermediate buffer. The compressed data is retrieved from the intermediate buffer and decoded and then developed into bit image data that can be used for printing. The bit image data is stored in a print data buffer. The bit image data is serially retrieved from the print data buffer in dot lines that correspond to one raster scan worth of data. The laser printer or other type or print mechanism then prints the corresponding characters or images on a print sheet.

As described above, print data formed from graphic data prepared in a print data preparation device, such as a personal computer, is compressed and encoded for transmission by a transmission driver and then outputted by transmission. The compressed print data is received in the laser printer and decoded temporarily into the original graphic print data. The graphic print data is then again compressed into a special type of compressed print data that can be developed into dot image data for printing by the printer. The special type of compressed print data is stored in an intermediate buffer. Because both processes for decoding the received compressed print data and processes for again compressing the data into the special type of compressed print data are performed in the laser printer, a great deal of time is required to perform these complicated data processes. Processes for receiving data and for printing are also delayed. As a result, processes for printing graphics data are inefficient.

SUMMARY OF THE INVENTION

It is an object of the present invention to overcome the above-described problems and provide a printing system and method of printing wherein graphic print data prepared in a print data preparation device is compressed for transmission according to a special compression/coding format that allows the printer to develop the resultant compressed print data into dot images so that efficiency of the print processes for graphic data in the printer can be improved.

To attain the above and other objects, a method of printing print data according to the present invention includes the steps of:

(a) preparing graphic print data in a print data preparation device;

(b) compressing and encoding the graphic data according to a predetermined compression/coding program in the print data preparation device so that resultant compressed and encoded graphic print data can be directly developed into dot image print data;

(c) transmitting the compressed and encoded graphic print data from the print data preparation device to a printing device;

(d) receiving the transmitted graphic print data at the printing device;

(e) storing the received graphic print data in a buffer of the printing device;

(f) developing the compressed and encoded graphic print data stored in the buffer into dot image print data; and (g) printing the dot image print data on a print medium according to the dot image print data corresponding to the graphic print data.

The predetermined compression/coding program used for compressing and encoding the graphic print data is dependant on a variety of the printing device which performs printing. The compression/coding program used for compressing and encoding the text print data is selectable independently of the variety of the printing device which performs printing.

In the printing method of the present invention, step (a) further includes preparing text print data; step (b) further includes compressing and encoding the text print data according to a preselected compression/coding program; step (c) further includes transmitting the compressed and encoded text print data from the print data preparation device to the printing device; step (d) further includes receiving the transmitted text print data at the printing device; step (e) further includes storing the received text print data in the buffer; step (f) further includes developing the text print data stored in the buffer into dot image print data corresponing to the text print data; and step (g) further includes printing the dot image print data corresponding to the text print data on the print medium according to the dot image print data corresponding to the text print data.

Step (c) includes steps of:

(c1) transmitting identification data indicating used compression/coding program;

(c2) transmitting identification data indicating a variety of print data that is compressed and encoded by the compression/coding program identified in step (c1); and (c3) transmitting compressed and encoded print data that is compressed and encoded for the variety of print data identified in step (c2) by the compression/coding program identified in step (c1).

Step (f) includes the steps of:

(f1) determining whether or not a predetermined amount of the compressed and encoded print data is stored in the buffer;

(f2) searching whether or not the identification data indicating the predetermined compression/coding program is present in relation to the compressed and encoded print data stored in the buffer;

(f3) transferring the compressed and encoded print data stored in the buffer into an intermediate buffer of the printing device when the search performed in step (f2) indicates that the predetermined compressed/coding program is present; and (f4) developing the compressed and encoded print data stored in the intermediate buffer into the dot image print data.

Step (f) may include the steps of:

(f11) determining whether or not a predetermined amount of the compressed and encoded print data is stored in the buffer;

(f12) searching whether or not the identification data indicating the predetermined compression/coding program is present in relation to the compressed and encoded print data stored in the buffer;

(f13) decoding the compressed and encoded print data stored in the buffer to reproduce the print data prepared at step (a), when the search performed in step (f12) indicates that the predetermined compressed/coding program is not present;

(f14) compressing and encoding the reproduced print data in step (f13) according to the predetermined compression/coding program in the printing device;

(f15) storing the compressed and encoded print data produced in step (f14) in an intermidiate buffer of the printing device; and (f16) developing the compressed and encoded print data stored in the intermediate buffer in step (f15) into dot image print data.

In the printing method according to the present invention, to transmit graphic print data, such as for diagrams and images, prepared in the print data preparation device to the printing device, the graphic print data is compressed and encoded according to the predetermined compression encoding program that allows its development into dot image print data. The transmitted compressed graphic print data is received and temporarily stored in the buffer of the printing device. Next, the compressed graphic print data stored in the buffer is developed into dot image print data, according to which the printing device prints on the print medium.

Because graphic print data prepared in the print data preparation device is transmitted to the printing device by compressing and encoding it according to the predetermined compression encoding format that allows the printer to develop it into dot image print data, the resultant compressed graphic print data received in the printing device can be developed into dot image print data in the buffer of the printing device. Therefore, complicated data processes, such as for decoding the compressed print data into the original graphic print data and for again compressing it into a special compressed print data that can be developed into dot image data by the printer, that are performed when compressed print data that was compressed and encoded into a compression format normally used for data transmission need not be performed. Therefore, the efficiency of print processes for graphic print data can be improved.

According to another aspect of the present invention, there is provided aprinting system which includes print data preparation device for preparing print data, first compression/encoding means for compressing and encoding the graphic print data according to a predetermined compression/coding program so that resultant compressed and encoded graphic print data can be directly developed into dot image print data, and second compression/encoding means for compressing and encoding the text print data according to a preselected compression/coding program. The print data includes at least one of graphic print data and text print data. First storage means is further provided for storing the compressed and encoded graphic and text print data produced by the first and second compression/encoding means. Developing means develops the compressed and encoded graphic and text print data stored in the first storage means int odot image print data. Second storage means is provided for storing dot image print data. The printing system further includes printing means for printing the dot image print data on a print medium according to the dot image print data corresponding to the graphic print data.

The predetermined compression/coding program used for compressing and encoding the graphic print data is correlated to the printing means. On the other hand, the compression/coding program used for compressing and encoding the text print data is selectable independently of a variety of the printing means.

The compressed and encoded print data includes first identification data indicating used compression/coding program, and second identification data indicating a variety of print data that is compressed and encoded by the compression/coding program identified by the first identification data. The developing means includes determining means for determining whether or not a predetermined amount of the compressed and encoded print data is stored in the first storage means, searching means for searching whether or not the first identification data indicating the predetermined compression/coding program is present in relation to the compressed and encoded print data stored in the first storage means, transferring means for transferring the compressed and encoded print data stored in the first storage means into the second storage means when the searching means indicates that the predetermined compressed/coding program is present, and dot image developing means for developing the compressed and encoded print data stored int he second storage means into the dot image print data.

The developing means may include determining means for determining whether or not a predetermined amount of the compressed and encoded print data is stored in the first storage means, searching means for searching whether or not the first identification data indicating the predetermined compression/coding program is present in relation to the compressed and encoded print data stored in the first storage means, decoding means for decoding the compressed and encoded print data stored in the first storage means to reproduce the print data prepared by the print data preparation device, when the searching means indicates that the predetermined compressed/coding program is not present, second compression/encoding means for compressing and encoding the reproduced print data by the decoding means according to the predetermined compression/coding program. The compressed and encoded print data produced by the second compression/encoding means is stored in the first storage means, and the compressed and encoded print data stored in the first storage means is developed into dot image print data.

In the printing system according to the present invention, when graphic print data, such as for drawings and images, is received from the print data preparation device, the first compression/encoding means compresses and encodes the graphic print data into compressed and encoded print data that can be developed by the printing means into dot image print data. The printing means receives the compressed and encoded graphic print data from the first compression/coding means and stores it in the first storage means. When the compressed and encoded text print data is stored in the first storage means, the compressed and encoded text print data is once decoded to reproduce the text print data produced by the print data preparation device and is again compressed and encoded according to the predetermined compression/coding program so that it can be developed into dot image print data. The compressed and encoded print data is then stored in the second storage means. The developing means develops the compressed print data received from the second storage means into dot image print data. Further, the printing means prints the developed dot image print data onto a print medium.

Graphic print data received from the print data preparation device is compressed and encoded according to the predetermined compression/coding program specific to the printing means, which program differs from the compression and encoding program used for normal transmission of data. The compressed print data can be developed into dot image print data in the printing means. Complicated data processes, such as for decoding the compressed print data into the original graphic print data and for again compressing it into a special compressed print data that can be developed into dot image data by the printer, that are performed when compressed print data that was compressed and encoded into a compression format normally used for data transmission need not be performed. Therefore, the efficiency of print processes for graphic print data can be improved.

BRIEF DESCRIPTION OF THE DRAWINGS

The particular features and advantages of the invention as well as other objects will become more apparent from the following description taken in connection with the accompanying drawings, in which:

FIG. 7(a) is a view showing print data in the form originally transmitted;

FIG. 7(b) is a view showing print data after having undergone compression/coding processes according to a transmission compression/coding format;

FIG. 7(c) is a view showing print data decoded into its original form;

FIG. 7(d) is a view showing print data after having undergone compression/coding processes according to a special compression/coding format specific to the printer;

DETAILED DESCRIPTION OF THE PREFERRED EMBODIMENTS

A preferred embodiment of the present invention will be described with reference to the accompanying drawings.

Figure 1:
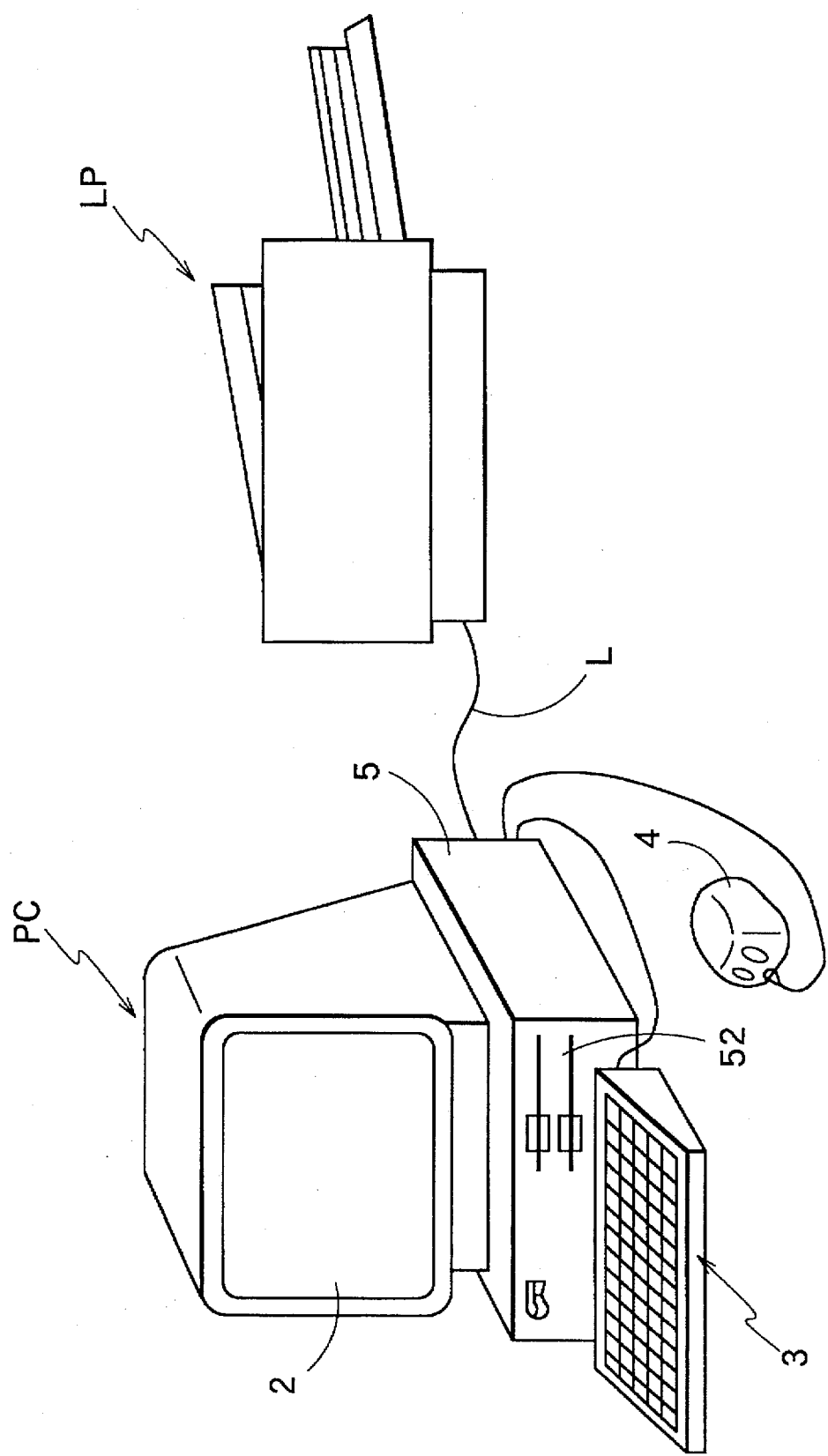
FIG. 1 is a view showing configuration of a print system.

FIG. 1 shows schematically a printing system which includes a personal computer PC (serving as a print data preparation device) for preparing print data and a laser printer LP (or a laser facsimile device) for printing compressed print data transmitted over a transmission cable from the personal computer PC.

First, a brief explanation of the personal computer PC will be provided. As shown in FIG. 1, the personal computer PC includes a CRT display 2, a keyboard 3, a mouse (serving as coordinate input unit) 4, and a control portion 5. The control portion 5 and the laser printer LP are connected by a transmission cable L so that print data such as graphics and text prepared with the personal computer PC can be transmitted to the laser printer LP.

Figure 2:
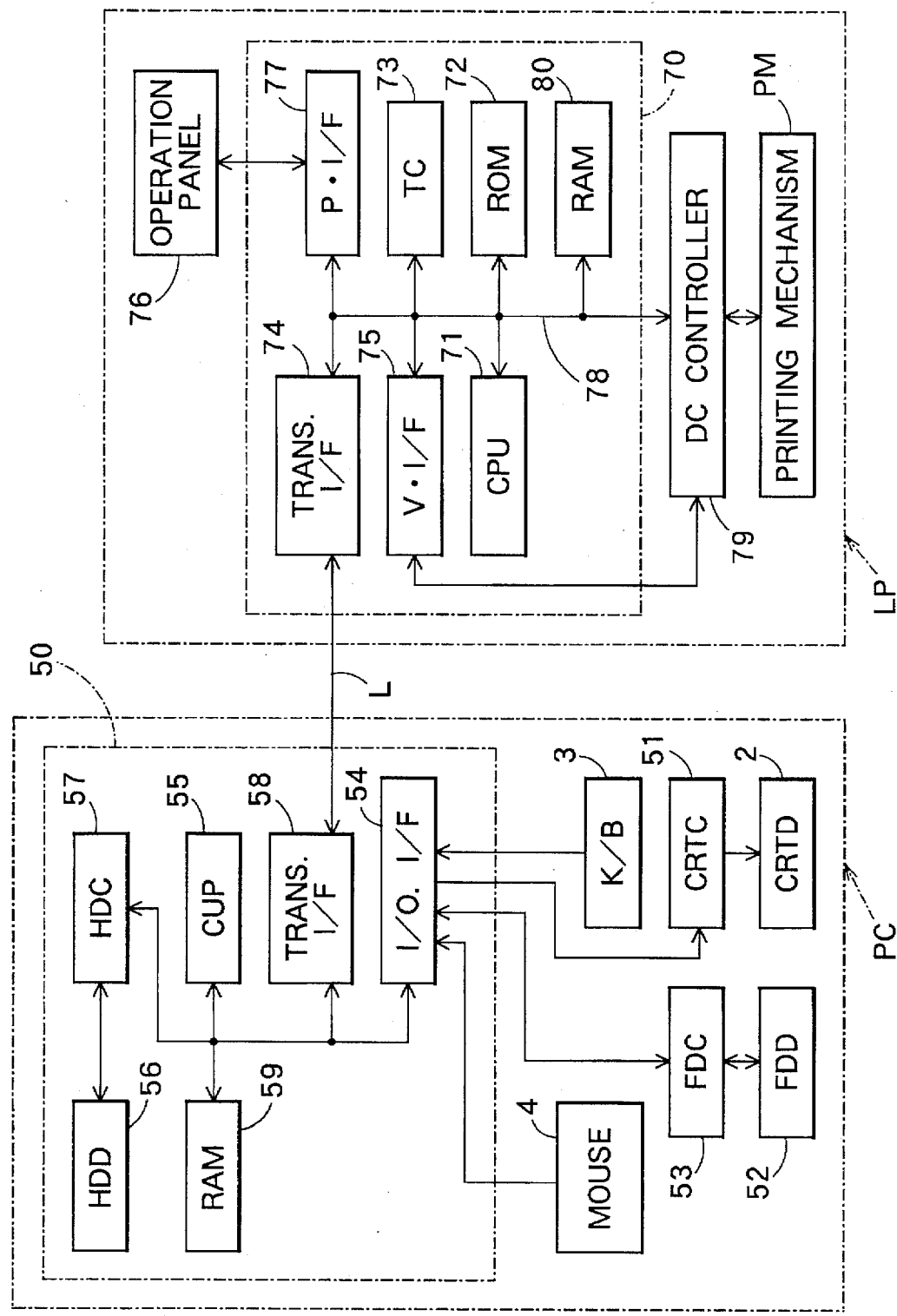
FIG. 2 is a block diagram showing control system of a laser printer and a personal computer.

Next, a brief ecplanation of the control system of the personal computer PC will be provided based on the block diagram in FIG. 2.

The keyborad (K/B) 3; a CRT display controller (CRTC) 51 for outputting display data to the CRT display 2; a floppy disk drive controller (FDC) 53 for controlling a floppy disk drive (FDD) 52 provided to the control portion 5; and the mouse 4 are individually connected to an input/output interface (input/output I/F) 54 provided in the control portion 50.

The control device 50 includes a CPU 55; the input/output interface 54 connected to the CPU 55 by a bus such as a data bus; a hard disk drive controller (HDC) 57 for driving a hard disk driver (HDD) 56 that is provided with a hard disk; a transmission interface (transmission I/F) 58; and a RAM 59.

In the hard disk are stored various control programs that allow the computer to function; a transmission driver for compression/coding, outputting, and transmitting print data according to a print control language PCL (data transmission command system); and a print data transmission control routine (to be described later) for transmission interface 58.

Several coding programs serving as transmission drivers are stored in the hard disk. Such programs are applied selectively to text data and graphic data. For text data, a run length coding program and a delta row coding program are, for example, stored in the hard disk. As is well known in the art, in the run length coding, compression of the text data is performed according to detection of repetitions in bit data, and in the delta row coding, compression of the text data is performed by comparing raster bit data of a raster scan with raster bit data of a preceding raster scan. Compression/coding of the graphic data is performed according to a special compression/coding format that is specific to the printer. Graphic data such as for diagrams or images can be developed into dot image print data in the laser printer LP by using the special compression/coding format. Any one of theses three formats, that is, the delta row coding format, the run length coding format, or the printer-dependent coding format can be set as the compression/coding format data according to which data is coded by compression. The transmission interface 58, the transmission driver, and the transmission control program serve as a compression transmission means provided in connection with the personal computer PC.

The laser printer LP, which serves as a printer, includes image transfer and sheet separation device, a fixing device, and a transport unit in addition to the laser scanner, the process cartridge, and the like. The control system for the laser printer LP will be described while referring to the block diagram shown in FIG. 2. The control system is basically the same as the type typically used in laser printers so will only be briefly described here.

The video controller 70 of the laser printer LP includes a 16 bit CPU 71; a ROM 72 for storing various programs; a RAM 80 provided with various memories such as a reception data buffer 82 for receiving and storing compressed print data transmitted from the personal computer PC; a timing control circuit (TC) 73 for generating a timing signal for controlling timing at which received compressed print data is stored into and retrieved from the reception data buffer 82; a transmission interface (transmission I/F) for receiving compressed print data transmitted from the pesonal computer PC via the transmission cable L; a video interface (V I/F) 75 having two 4 kilobyte scan buffers for serially outputting print information converted into bit image data; and a panel interface (P I/F) for receiving a signal from the operation panel 76 that is provided with a plurality of switches for printing process, data reception, and the like. These components are individually connected to the CPU 71 via a bus 78 such as a data bus.

In addition to the laser scanner, the process cartridge, the image transfer and sheet separation device, the fixing unit, and the transport device, the printing mechanism PM further includes various other electrical components and a main motor for driving a photosensitive drum and the transport device. In addition to the main motor and various electrical components, the DC controller 79 is configured to control drive of a scanner motor for driving a semiconductor laser, a hexagonal mirror, and other components.

In addition to various control programs normally provided for controlling a laser facsimile device, the ROM 72 is prestored with a font memory storing print dot pattern data for a plurality of characters including characters and symbols; a memory management program for managing start addresses and memory capacities of the memories 81 through 86 that are provided to the RAM 80; and a print control language interpreter for interpreting processes of a print control language (PCL) of the compressed print data received from the external source.

Figure 3:
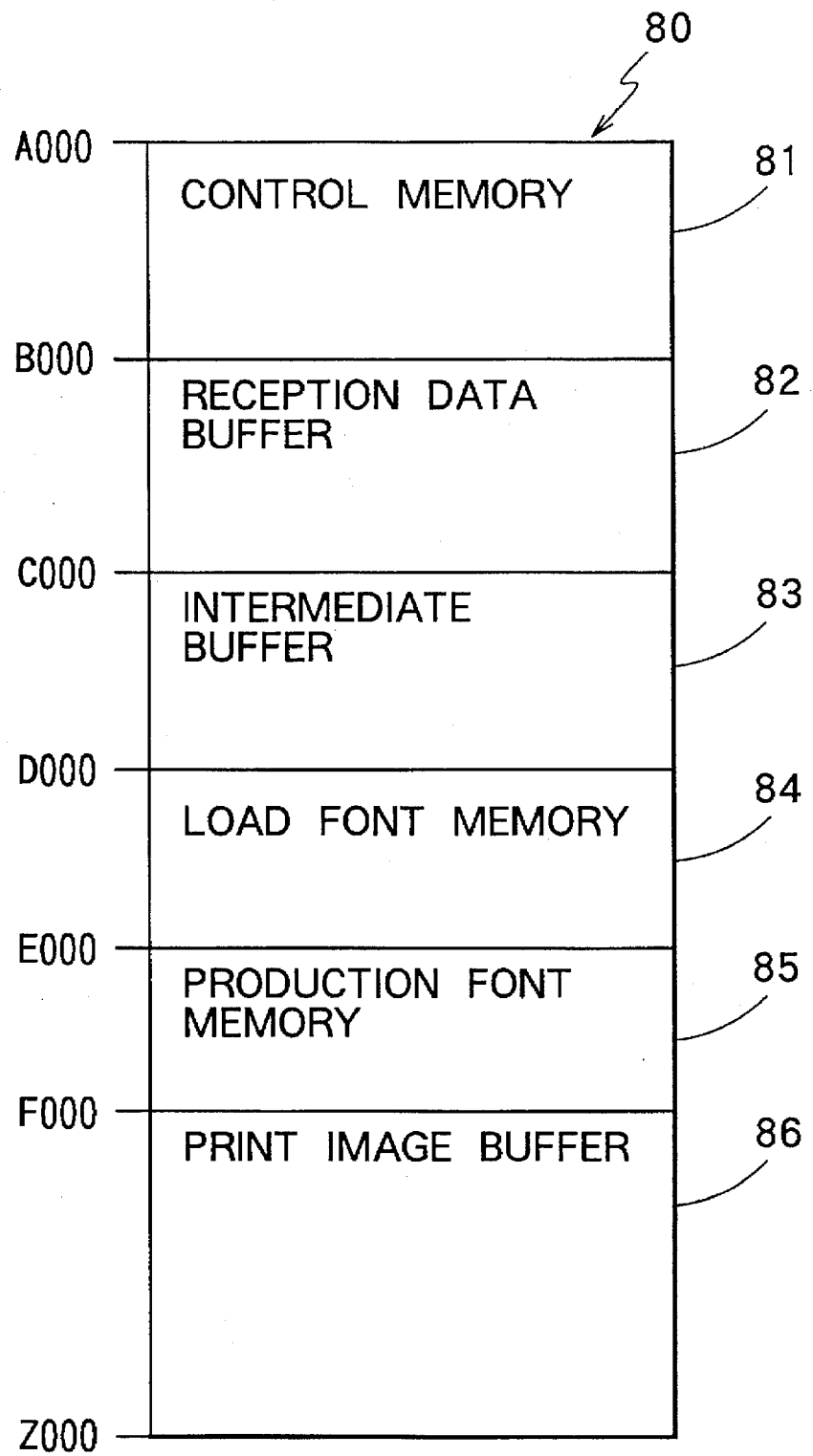
FIG. 3 is an explanatory view showing a memory map of a RAM.

As shown in FIG. 3, the RAM 80 is provided with a control memory 81 with a predetermined capacity; a reception data buffer 82 for temporarily storing compressed print data received from the personal computer PC; an intermediate buffer 83 for storing one page worth of compressed print data received from the reception data buffer 82; a load font memory 84 for receiving and storing font data transmitted from the personal computer PC; a production font memory 85 for storing production font data produced by modifying the font data from the load font memory 84 or from font data received from the font memory of the ROM 72; and a print image buffer 86 with a predetermined capacity. The control memory 81 includes various memories such as various pointers and buffers for temporarily storing results of calculations performed in the CPU 71.

That is, the predetermined capacity of the control memory 81 starting from the start address A000; the predetermined capacity of the reception data buffer 82 starting from the address B000; and the intermediate buffer 83, the load font memory 84, the production font memory 85, and the print image buffer 86 from address C0000 to the end address Z0000 coexist adjacent to each other in the RAM 80.

Figure 4:
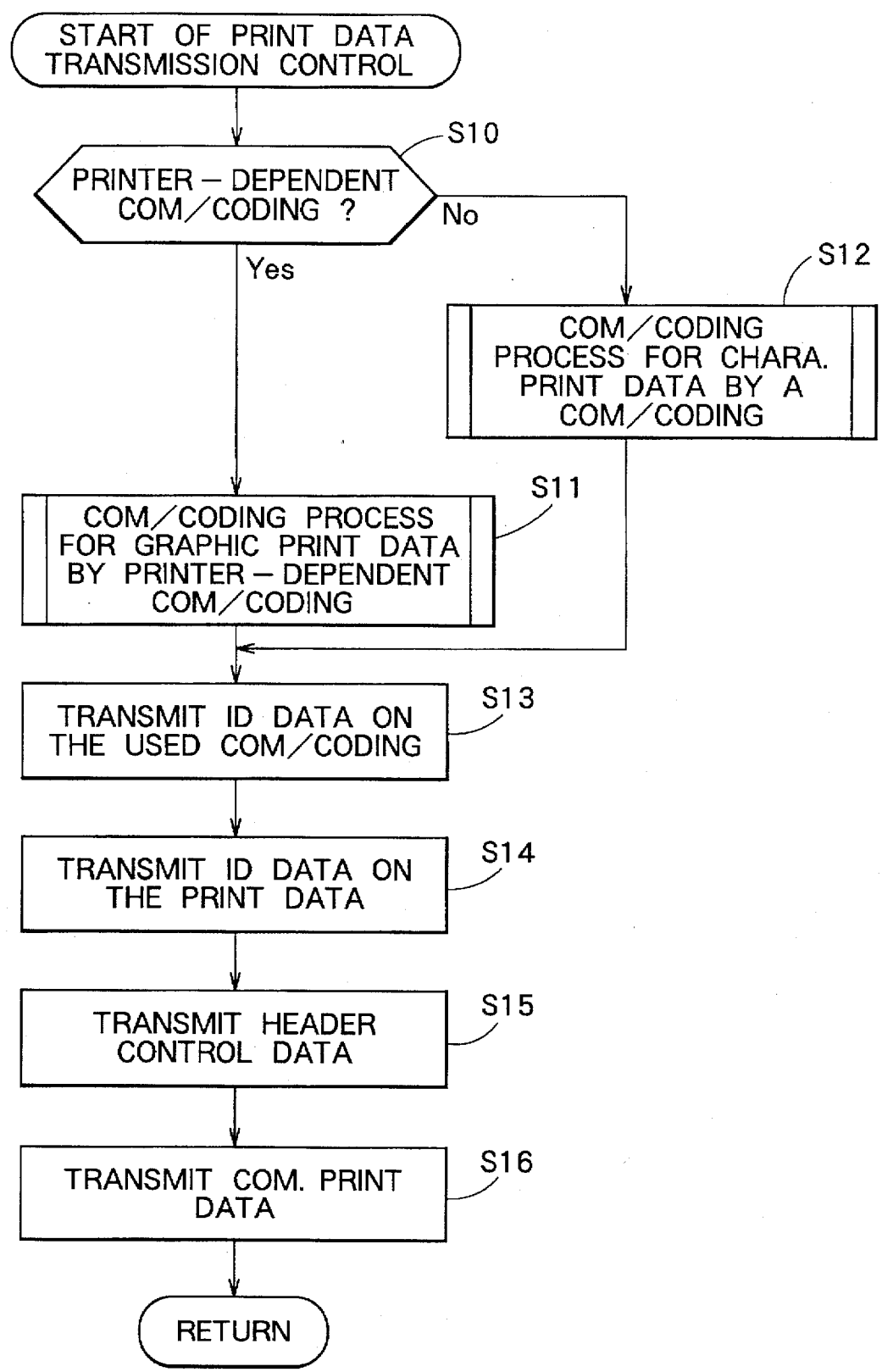
FIG. 4 is a flowchart schematically showing a routine for controlling transmission of print data.
Figure 5:
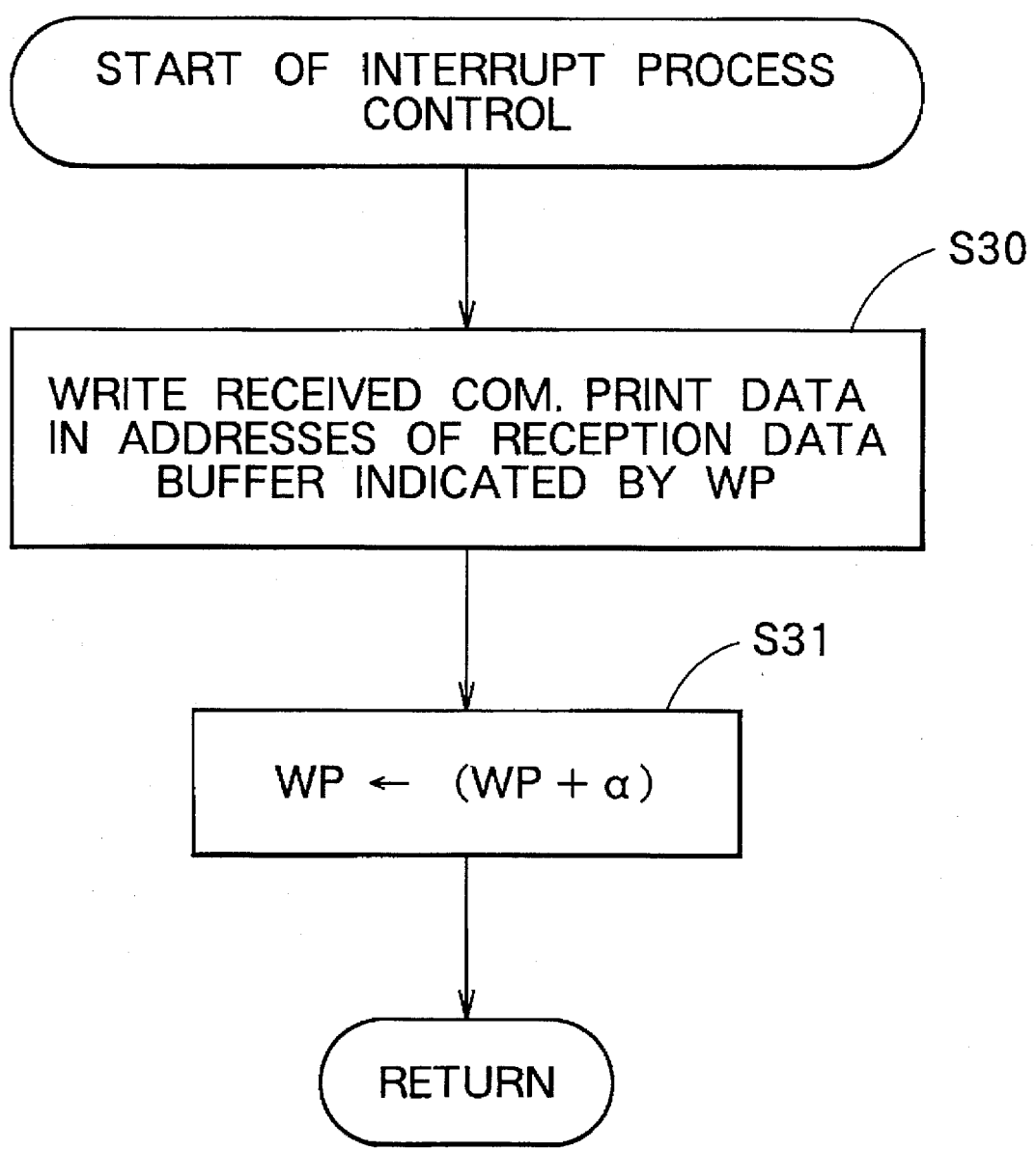
FIG. 5 is a flowchart schematically showing an interrupt routine for controlling processes when print data is received.

Next, an explanation of a routine performed in the control unit 50 of the personal computer PC for controlling transmission of print data will be provided while referring to the flowcharts shown in FIGS. 4 and 5. Individual steps are indicated in the drawings as Si (wherein i represents individual step numbers). This print data transmission control routine is for transmitting compressed print data (produced by the PCL transmission driver) when a transmission key on the keyboard 3 is operated. Further, print data to be transmitted, such as text data or graphic data, is stored in a floppy fisk inserted in the floppy disk drive 52. The compression/coding files to be used in compression and encoding the text print data and the graphic print data are stored in the hard disk 56.

When this contol routine is started, when the accessed compression/coding file does not indicate the printer-dependent compression/coding file for use in the graphic print data, that is, special compression/coding program file specific to the printer (i.e., S10 is NO), compression/coding processes are performed on the text print data according to the prescribed compression/coding program which is distinct from the printer-dependent special compression/coding program, in S12. Next, identification data on the used compression/coding format is transmitted in S13. The identification data that indicates whether the print data is text data (character data) or graphic data is transmitted in S14. Further, header control data is transmitted in S15. The head control data is formed from various types of control data required for printing the print data. Examples of control data include print start position and control data set during initialization of the printing mechanism PM. The compressed and encoded print data is transmitted in S16, whereupon this routine is completed and the program proceeds to the main routine.

An example will be given for transmitting print data with the configuration "F0, F0, F0, F0, 88, F0, ... F0" as shown in FIG. 7(a) when the compression/coding format is set to a compression/coding format other than the special compression/coding format specific to the printer, for example, when the compression/coding format is set to runlength coding. Compressed print data of "03, F0" is produced to represent the "F0" repeated four times in succession at the start of the transmitted print data. Next, compressed print data of "00, 88" is produced to represent the single succeeding "88" in the print data. This routine is continued to form the compressed print data shown in FIG. 7(b), which is transmitted to the laser printer LP over the transmission cable L.

When the special compression/coding file is accessed when this routine starts (i.e., S10 is YES), graphic print data is compressed and encoded in S11 according to the special compression/coding program. Then, S13 through S16 are performed in the same manner as described above. The compressed and encoded graphic print data, control data, and various types of identification data are transmitted. Then, this routine is completed and the program returns to the main routine.

Figure 8:
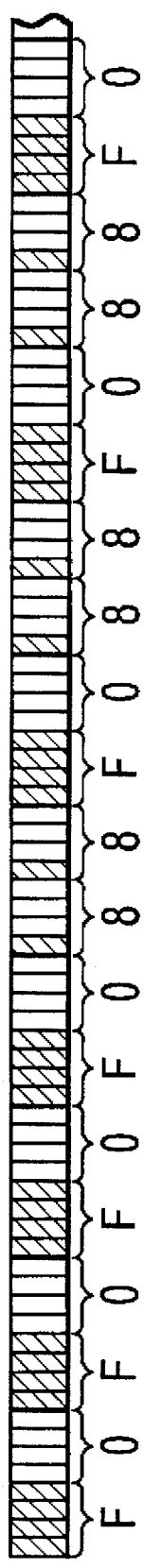
FIG. 8(a) is a view showing print data in the form originally transmitted.
FIG. 8(b) is a view showing print data after having undergone compression/coding processes according to a special compression/coding format specific to the printer.
Figure 8:
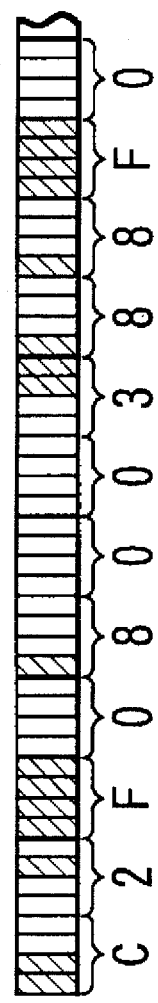

An example will be given for transmitting graphic data with the configuration "F0, F0, F0, F0, 88, F0, ... F0" as shown in FIG. 8(a) when the special compression/coding format specific to the printer is set as the compression/coding format type. Compressed print data "C2, F0" is produced to represent the "F0" repeated four times in succession at the start of the transmitted graphic data. Next, compressed print data of "80, 03" is produced to represent the "88,F0" repeated three times in the succeeding 16 bits of data in the print data. This process is continued to form the compressed print data shown in FIG. 8(b), which is transmitted to the laser printer LP over the transmission cable L.

Next, an explanation of an interrupt routine for controlling processes during reception of print data performed by the video controller 70 of the laser printer LP will be provided while referring to the flowchart in FIG. 5.

This interrupt routine is started by interrupting the CPU 1 each time print data, various control data, and the like from the personal computer PC are received at the transmission interface 74 via the transmission cable L. The received print data, various control data, and the like is written in S30 in the addresses of the reception data buffer 82 that indicates the pointer value WP of the writer address pointer. The write address pointer value WP is incremented in S31 by the total bites a in one series of received print data. Then this routine is completed and the program returns to the main routine.

Figure 6:
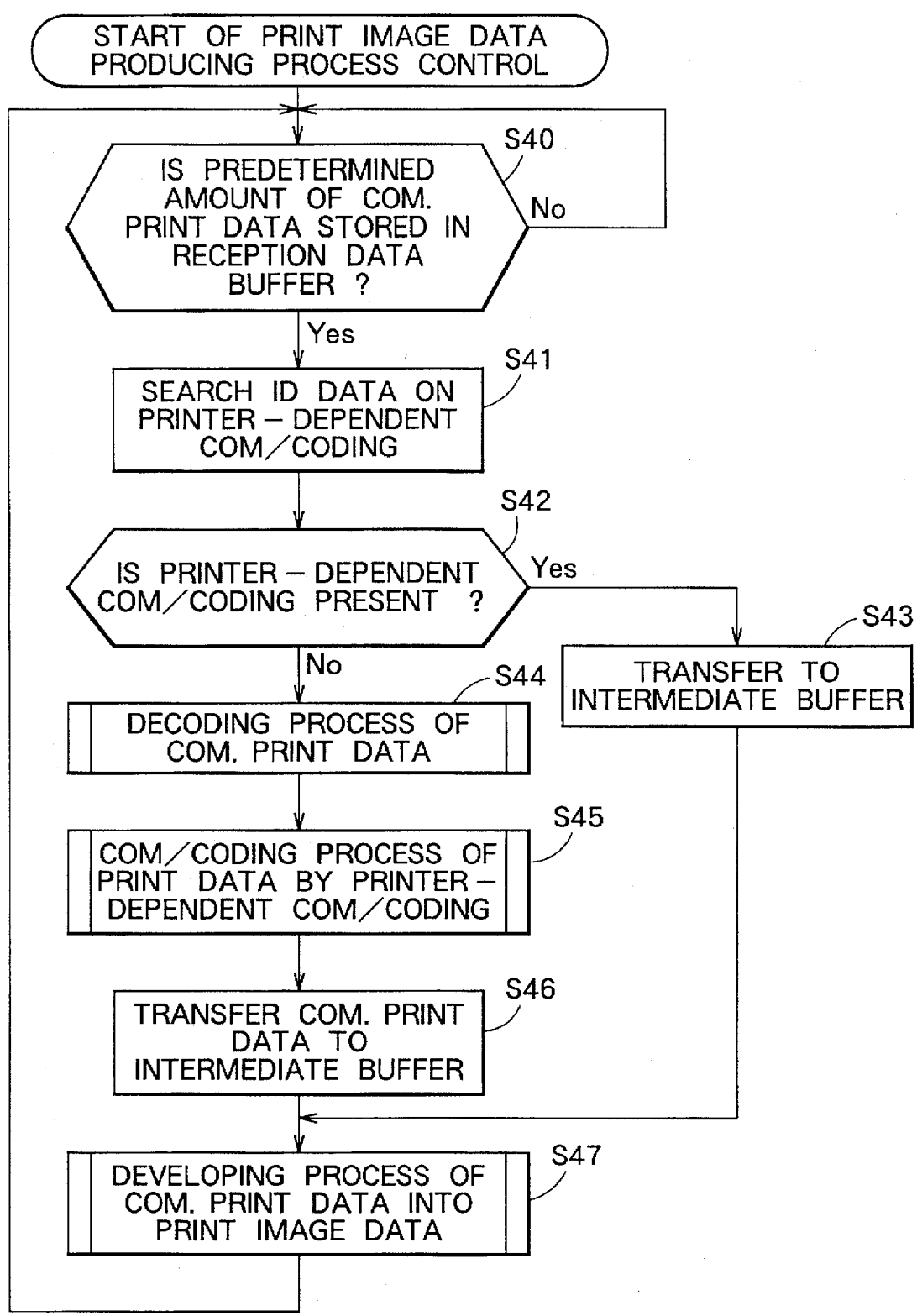
FIG. 6 is a flowchart schematically showing a routine for controlling processes for preparing print image data.

Next, an explanation of a routine for controlling processes performed by the video controller 70 of the laser printer LP for producing image data will be provided while referring to the flowchart of FIG. 6.

This routine is started when the power source of the laser printer LP is turned on. First, compressed print data received according to during reception of print data is serially stored in the recaption data buffer 82. When a predetermined amount of compressed print data (for example, one tenth of a page worth of print data) is stored in the reception data buffer 82 (i.e., S40 is YES), whether or not variety data indicating the special compression/coding format of the printer is stored with the predetermined amount of compressed print data is searched in S41.

When variety data indicating the special compression/coding format of the printer is not present, that is, when variety data indicating a transmission compression/coding format such as run-length compression/coding or delta row compression/coding exists (i.e., S42 is NO), decoding processes are performed in S44 for decoding the compression print data stored in the recaption data buffer 82 back to the original character print data. Next, the original character print data is compressed and encoded in S45 according to the special compression/coding format specific to the printer to produce compressed and encoded print data that can be developed into dot image print data. The compressed and encoded print data is transmitted to and stored in the intermediate buffer 83 in S46.

For example, when the compressed print data shown in FIG. 7(b) is transmitted, the transmitted compressed print data is serially stored in the reception data buffer 82, temporarily decoded into the original print data shown in FIG. 7(c), compressed and coded as shown in FIG. 7(d) according to the special compression/coding format specific for the printer, and serially stored after the address C0000 of the intermediate buffer 83.

Next, in S47, the character compressed print data stored in the intermediate buffer 83 is developed into dot image print image data based on the font data such as that in the composition format memory 85 and the load font memory 84. The dot image print image data is stored in the print image buffer 86 and the program returns to S40. Next, S40 through S47 are repeated for each one raster scan worth of print data until all the received print data is developed into print image data and stored in the print image buffer 86.

Then a print process routine (not shown in the drawings) is performed as an interrupt routine in the CPU 71. The print image data stored in the print image buffer 86 is retrieved in units equivalent to one raster scan. The retrieved print image data is outputted to the laser scanner with each print timing signal and printed on the recording sheet.

When the search of the compression print data stored in the reception data buffer 82 revealsthat variety data indicating the special compression/coding format is stored with the compressed print data (i.e., S42 is YES), the compressed print data stored in the reception data buffer 82, that is, the graphic compressed print data that was compressed and encoded according to the special compression/coding format is transmitted directly to the intermediate buffer 83 in S43 without being compressed and encoded according to the special compression/coding format in S44 and S45. The program then returns to S40 via S47. For example, when the graphic compressed print data shown in FIG. 8(b) is transmitted, the transmitted compressed print data is serially stored in the reception data buffer 82. Afterward, the graphic compressed print data is directly transmitted to the intermediate buffer 83 without being compressed and encoded according to the special compression/coding format.

Afterward, S40 through S43, and S47 are repeatedly executed for each raster scan worth of print data. All received graphic print data is developed into dot image print data, which is then stored in the print image buffer 86. In the same manner as described above, the print data stored in the print image buffer 86 is retrieved in raster scan units, outputted to the laser scanner at each print timing signal, and printed on the recording sheet.

As described above, graphic print data prepared in the personal computer PC is compressed and encoded according to the special compression/coding format, this format being different from a transmission compression/coding format normally used when transmitting data. In this way compressed print data that can be developed into dot image print data by the laser printer LP is transmitted to the laser printer LP. The laser printer LP transmits the compressed print data (that was compressed and encoded according to the special compression/coding format) from the reception buffer, where the print data was received, directly to an intermediate buffer. Therefore, many complicated data processes can be omitted. For example, compressed print data, that was compressed and encoded according to a compression format normally used for transmitting data, need not be decoded back to the original graphic data. Also, the graphic data need not be compressed and encoded according to the special compression/coding format into compressed print data that can be developed into dot image data by the printer. In this way, printing of graphic print data becomes more efficient.

Here an explanation will be provided for the corresponence between the various means of the claims and the components described in the embodiment. The first compression/coding means corresponds to the print data transmission routine, particularly to S11. The second compression/coding means corresponds to the print image data preparation routine, particularly to S44 and S45. The developing means corresponds to the print image data preparation routine, particularly to S47.

Based on existing technology or technology obvious to one skilled in the art, various modifications can be made to the various devices and programs of the above-described embodiment without deparing from the spirit of the invention. For example, the present invention can be applied to any printer which receives and prints prepared and transmitted print data.

According to the present invention, graphic print data prepared in the print data preparation device is compressed and encoded according to the predetermined compression/coding program into compressed and encoded print data that can be developed into dot image print data by the printer. The compressed and encoded print data is transmitted to the printer. The received graphic compressed print data can be developed into dot image print data in the buffer of the printer. Therefore, many complicated data processes can be omitted. For example, compressed print data, that was compressed and encoded according to a compression format normally used for transmitting data, need not be decoded back to the original graphic data. Also, the graphic data need not be compressed and encoded according to the printer into compressed print data that can be developed into dot image data by the printer. In this way, printing graphic print data becomes more efficient.

What is claimed is:

1. A method of printing print data, comprising the steps of:
   (a) preparing graphic print data in a print data preparation device;
   (b) compressing and encoding the graphic data according to a predetermined compression/coding program in the print data preparation device so that resultant compressed and encoded graphic print data can be directly developed into dot image print data;
   (c) transmitting the compressed and encoded graphic print data from the print data preparation device to a printing device together with identification data indicating the used compression/coding program;
   (d) receiving the transmitted graphic print data at the printing device;
   (e) storing the received graphic print data in a buffer of the printing device;
   (f) developing the compressed and encoded graphic print data stored in the buffer into dot image print data using the identification data; and
   (g) printing the dot image print data on a print medium according to the dot image print data corresponding to the graphic print data.

2. A method as claimed in claim 1, wherein the predetermined compression/coding program used for compressing and encoding the graphic print data is dependent on a variety of the printing device which performs printing.

3. A method as claimed in claim 2, wherein
   step (a) further includes (a') preparing text print data;
   step (b) further includes (b') compressing and encoding the text print data according to a preselected compression/coding program;
   step (c) further includes (c') transmitting the compressed and encoded text print data from the print data preparation device to the printing device;
   step (d) further includes (d') receiving the transmitted text print data at the printing device;
   step (e) further includes (e') storing the received text print data in the buffer;
   step (f) further includes (f') developing the text print data stored in the buffer into dot image print data corresponding to the text print data; and
   step (g) further includes (g') printing the dot image print data corresponding to the text print data on the print medium according to the dot image print data corresponding to the text print data.

4. A method as claimed in claim 3, wherein the compression/coding program used for compressing and encoding the text print data is selectable independently of the variety of the printing device which performs printing.

5. A method as claimed in claim 4, wherein step (c) includes steps of:
   (c1) transmitting identification data indicating a variety of print data that is compressed and encoded by the compression/coding program identified in step (c1); and
   (c2) transmitting compressed and encoded print data that is compressed and encoded for the variety of print data identified in step (c1) by the compression/coding program identified in step (c).

6. A method as claimed in claim 5, wherein step (f) comprises the steps of:
   (f1) determining whether or not a predetermined amount of the compressed and encoded print data is stored in the buffer;
   (f2) searching whether or not the identification data indicating the predetermined compression/coding program is present in relation to the compressed and encoded print data stored in the buffer;
   (f3) transferring the compressed and encoded print data stored in the buffer into an intermediate buffer of the printing device when the search performed in step (f2) indicates that the predetermined compressed/coding program is present; and
   (f4) developing the compressed and encoded print data stored in the intermediate buffer into the dot image print data.

7. A method as claimed in claim 5, wherein step (f) comprises the steps of:
   (f11) determining whether or not a predetermined amount of the compressed and encoded print data is stored in the buffer;
   (f12) searching whether or not the identification data indicating the predetermined compression/coding program is present in relation to the compressed and encoded print data stored in the buffer;
   (f13) decoding the compressed and encoded print data stored in the buffer to reproduce the print data prepared at step (a), when the search performed in step (f12) indicates that the predetermined compressed/coding program is not present;
   (f14) compressing and encoding the reproduced print data in step (f13) according to the predetermined compression/coding pregram in the printing device;
   (f15) storing the compressed and encoded print data produced in step (f14) in an intermediate buffer of the printing device; and
   (f16) developing the compressed and encoded print data stored in the intermediate buffer in step (f15) into dot image print data.

8. A printing system comprising:
   print data preparation device for preparing print data, the print data including at least one of graphic print data and text print data;
   first compression/encoding means for compressing and encoding the graphic print data according to a predetermined compression/coding program so that resultant compressed and encoded graphic print data can be directly developed into dot image print data;
   second compression/encoding means for compressing and encoding the text print data according to a preselected compression/coding program;

identification data producing means for producing identification data indicative of the predetermined compression/coding program used for compressing and encoding the graphic print data and also the preselected compression/coding program used for compressing and encoding the text print data;

first storage means for storing the compressed and encoded graphic and text print data produced by said first and second compresion/encoding means;

developing means for developing the compressed and encoded graphic and text print data stored in said first storage means into dot image print data in accordance with the identification data;

second storage means for storing dot image print data; and printing means for printing the dot image print data on a print medium according to the dot image print data corresponding to the graphic print data.

9. A printing system as claimed in claim 8, wherein the predetermined compression/coding program used for compressing and encoding the graphic print data is correlated to said printing means.

10. A printing system as claimed in claim 9, wherein the compression/coding program used for compressing and encoding the text print data is selectable independently of a variety of the printing means.

11. A printing system as claimed in claim 10, wherein the identification data includes:

first identification data indicating used compression/coding program; and second identification data indicating a variety of print data that is compressed and encoded by the compression/coding program identified by the first identification data.

12. A printing system as claimed in claim 11, wherein said developing means comprises:

determining means for determining whether or not a predetermined amount of the compressed and encoded print data is stored in said first storage means;

searching means for searching whether or not the first identification data indicating the predetermined compression/coding program is present in relation to the compressed and encoded print data stored in said first storage means;

transferring means for transferring the compressed and encoded print data stored in said first storage means into said second storage means when said searching means indicates that the predetermined compressed/coding program is present; and dot image developing means for developing the compressed and encoded print data stored in said second storage means into the dot image print data.

13. A printing device as claimed in claim 11, wherein said developing means comprises:

determining means for determining whether or not a predetermined amount of the compressed and encoded print data is stored in said first storage means;

searching means for searching whether or not the first identification data indicating the predetermined compression/coding program is present in relation to the compressed and encoded print data stored in said first storage means;

decoding means for decoding the compresses and encoded print data stored in said first storage means to reproduce the print data prepared by said print data preparation device, when said searching means indicates that the predetermined compressed/coding program is not present;

second compression/encoding means for compressing and encoding the reproduced print data by said decoding means according to the predetermined compression/coding program; and wherein the compressed and encoded print data produced by said second compression/encoding means is stored in said first storage means, and wherein the compressed and encoded print data stored in said first storage means is developed into dot image print data.

14. A printer for use with a preparation device comprising print data preparation device for preparing print data, the print data including at least graphic print data; first compression/encoding means for compressing and encoding the graphic print data according to a predetermined compression/coding program so that resultant compressed and encoded graphic print data can be directly developed into dot image print data, the printer comprising:

first storage means for storing the compressed and encoded graphic data produced by the first compression/encoding means, the compressed and encoded graphic data including first identification data indicating the compression/coding program that has been used;

developing means for developing the compressed and encoded graphic print data stored in the first storage means into dot image print data using the identification data; and printing means for printing the dot image print data on a print medium according to the dot image print data.

15. A printer as claimed in claim 14, wherein the predetermined compression/coding program used for compressing and encoding the graphic print data is correlated to the printing means.

16. A printer as claimed in claim 15, wherein the preselected compression/coding program used for compressing and encoding the text print data is selectable independently of a variety of the printing means.

17. A printer as claimed in claim 15, wherein the compressed and encoded print data further includes:

second identification data indicating the variety of the print data that has been compressed and encoded by the compression/coding program identified by the first identification data.

18. A printer as claimed in claim 17, wherein the developing means comprises:

determining means for determining whether or not a predetermined amount of the compressed and encoded print data is stored in the first storage means;

searching means for searching whether or not the first identification data indicates that the predetermined compression/coding program has been used in relation to the compressed and encoded print data stored in the first storage means;

transferring means for transferring the compressed and encoded print data stored in the first storage means into a second storage means when the searching means indicates that the predetermined compressed/coding program has been used; and dot image developing means for developing the compressed and encoded print data stored in the second storage means into the dot image print data.

* * * * *